United States Patent [19]

Markusch et al.

[11] Patent Number: 5,236,994

[45] Date of Patent: Aug. 17, 1993

[54] PROCESS FOR SEALING AND/OR PRIMING CONCRETE WITH AQUEOUS POLYISOCYANATE DISPERSIONS AND THE CONCRETE OBTAINED BY THIS PROCESS

[75] Inventors: Peter H. Markusch, McMurray; William Cibulas, Coraopolis, both of Pa.; Robin E. Tirpak, Wheeling, W. Va.

[73] Assignee: Miles Inc., Pittsburgh, Pa.

[21] Appl. No.: 676,678

[22] Filed: Mar. 28, 1991

[51] Int. Cl.$^5$ ............................................. C08L 75/04
[52] U.S. Cl. .................................... 524/589; 524/591; 524/839; 427/393.6; 428/423.1; 428/425.5; 428/703
[58] Field of Search ............... 524/589, 591, 839; 427/393.6; 428/423.1, 425.5, 703

[56] References Cited

U.S. PATENT DOCUMENTS

| 3,792,023 | 2/1974 | Havenith et al. | 260/77.5 AQ |
|---|---|---|---|
| 3,905,929 | 9/1975 | Noll | 260/29.2 TN |
| 3,996,154 | 12/1976 | Johnson et al. | 252/312 |
| 4,433,095 | 2/1984 | Hombach et al. | 524/563 |
| 4,463,126 | 7/1984 | Gruber et al. | 524/589 |
| 4,764,553 | 8/1988 | Mosbach et al. | 524/591 |
| 4,904,522 | 2/1990 | Markusch | 428/288 |

FOREIGN PATENT DOCUMENTS 458153 11/1991 European Pat. Off. .

*Primary Examiner*—Maurice J. Welsh
*Attorney, Agent, or Firm*—Joseph C. Gil; Thomas W. Roy

[57] ABSTRACT

The present invention is directed to a process for sealing and/or priming concrete by applying to concrete an aqueous polyisocyanate dispersion which has an isocyanate content of at least 0.5% by weight, based on the weight of the polyisocyanate, and is prepared by a) dispersing in water a polyisocyanate which has an isocyanate content of at least 12% by weight and b) optionally reacting the dispersed polyisocyanate with i) a primary or secondary monoamine containing at least one hydroxyl group in an amount sufficient to provide an equivalent ratio of amino groups to isocyanate groups of 0:1.0 to 0.7:1.0 and/or ii) a polyamine having primary and/or secondary amino groups and a molecular weight of 400 or less in an amount sufficient to provide an equivalent ratio of amino groups to isocyanate groups of 0:1.0 to 0.4:1.0, provided that when components i) and ii) are both reacted with the dispersed polyisocyanate, component i) is mixed with the dispersed polyisocyanate either before or during the mixing of component ii) and the equivalent ratio of amino groups from both components i) and ii) does not exceed 0.95:1.0.

The present invention is also directed to the primed and sealed concrete obtained in accordance with this process.

24 Claims, No Drawings

PROCESS FOR SEALING AND/OR PRIMING CONCRETE WITH AQUEOUS POLYISOCYANATE DISPERSIONS AND THE CONCRETE OBTAINED BY THIS PROCESS

BACKGROUND OF THE INVENTION

1. Field of the Invention

The present invention is directed to a process for sealing and/or priming concrete with an aqueous polyisocyanate and to the concrete obtained in accordance with this process.

2. Description of the Prior Art

It is known to use moisture-curing NCO prepolymers such as those disclosed in U.S. Pat. No. 3,792,023 to protect concrete from the degrading effects of water, salt and acid rain. However, in order to penetrate concrete, the prepolymer is usually diluted to a solids content of 10 to 30% by weight with organic solvents which are inert to isocyanate groups. The solvents not only represent a flammability hazard, but also create an environmental problem.

Another restriction on using the NCO prepolymers is that the concrete has to be absolutely dry. If water is present, the hydrophobic polyisocyanate solutions cannot penetrate the concrete and foaming occurs on the concrete surface. Therefore, the NCO prepolymers are not suitable for use as sealants on wet or "green" concrete.

Sealants are applied to concrete before it is fully cured ("green" concrete) in order to prevent the rapid evaporation of water from the concrete and, thus, improve the cure and ultimately the final strength of the concrete. Presently, fluorinated hydrocarbons or oils are used to seal "green" concrete. While these sealants are effective in preventing the evaporation of water, they do not protect the concrete from water, salt and acid rain. In order to achieve such protection, a top coat is necessary. However, commercial top coats do not adhere to fluorinated hydrocarbon or oil-based sealants which means that the sealant must be removed, e.g., by sand blasting, before application of a protective top coat.

Accordingly, an object of the present invention is to provide a composition which functions as a sealant to prevent the evaporation of water and improve the cure and strength of green concrete. A further object of the present invention is to provide a sealant which also functions as a primer such that a firmly adhering top coat can be directly applied to the sealant.

These objects can be achieved in accordance with the present invention by using certain aqueous polyisocyanate dispersions as the primer/sealant. Surprisingly, the polyisocyanate dispersions can penetrate and seal wet concrete prior to the polyisocyanate reacting with the dispersion water or the water present in the wet concrete.

U.S. Pat. No. 4,904,522 discloses the use of such polyisocyanate dispersions as binders for fiberglass. However, there is no suggestion in this patent to use the polyisocyanate dispersions for the treatment of concrete nor would it be possible to determine from this reference that the polyisocyanate dispersions could function as primers and sealants for concrete.

Copending application. U.S. Ser. No. 07/529,056, filed May 25, 1990, is directed to reducing the isocyanate content of aqueous polyisocyanate dispersions by reacting the dispersed polyisocyanates reacted with monoamines containing at least one hydroxyl group in order to improve their effectiveness as binders for fiberglass. Copending application is directed to increasing the pot life of aqueous polyisocyanate dispersions by reacting the dispersed polyisocyanates with polyamines in order to encapsulate the dispersed polyisocyanates and reduce their reactivity to water. Copending application is directed to to an improved method for reducing the isocyanate content of aqueous polyisocyanate dispersions by reacting the dispersed polyisocyanates with both monoamines containing at least one hydroxyl group and polyamines. None of the these copending applications suggest the use of the polyisocyanate dispersions for the treatment of concrete not do they provide any indication that the polyisocyanate dispersions could function as primers and sealants for concrete.

SUMMARY OF THE INVENTION

The present invention is directed to a process for sealing and/or priming concrete by applying to concrete an aqueous polyisocyanate dispersion which has an isocyanate content of at least 0.5% by weight, based on the weight of the polyisocyanate, and is prepared by a) dispersing in water a polyisocyanate which has an isocyanate content of at least 12% by weight and b) optionally reacting the dispersed polyisocyanate with i) a primary or secondary monoamine containing at least one hydroxyl group in an amount sufficient to provide an equivalent ratio of amino groups to isocyanate groups of 0:1.0 to 0.7:1.0 and/or ii) a polyamine having primary and/or secondary amino groups and a molecular weight of 400 or less in an amount sufficient to provide an equivalent ratio of amino groups to isocyanate groups of :1.0 to 0.4:1.0, provided that when components i) and ii) are both reacted with the dispersed polyisocyanate, component i) is mixed with the dispersed polyisocyanate either before or during the mixing of component ii) and the equivalent ratio of amino groups from both components i) and ii) does not exceed 0.95:1.0.

The present invention is also directed to the primed and sealed concrete obtained in accordance with this process.

DETAILED DESCRIPTION OF THE INVENTION

Suitable polyisocyanates for use in preparing the polyisocyanates to be dispersed in water in accordance with the present invention include the known aliphatic, cycloaliphatic, araliphatic, aromatic and heterocyclic polyisocyanates. Suitable examples of these polyisocyanates include those described by W. Siefken in Justus Liebigs Annalen der Chemie, 562, pages 75 to 136. Prior to being dispersed in water, the polyisocyanates have an isocyanate content of at least about 12%, preferably at least about 15% and more preferably at least about 20% by weight, based on the weight of the polyisocyanate. Polyisocyanates having a lower isocyanate content and prepared, e.g., by reacting a monomeric polyisocyanate with a high molecular weight polyol, have sufficiently high viscosities that it is difficult to disperse them in water even if they are hydrophilically modified.

Examples of suitable monomeric polyisocyanates include 1,6-hexamethylene diisocyanate, 1,12-dodecane diisocyanate, cyclobutane-1,3-diisocyanate, cyclohexane-1,3-and/or -1,4-diisocyanate, 1-isocyanate-3,3,5-trimethyl-5-isocyanatomethyl cyclohexane (isophorone diisocyanate), 2,4-and/or 2,6-hexahydrotoluylene diisocyanate, hexahydro-1,3-and/or -1,4-phenylene diisocyanate, perhydro-2,4'-and/or -4,4'-diphenylmethane diisocyanate, 1,3-and/or 1,4-phenylene diisocyanate, 2,4-and/or 2,6-toluylene diisocyanate, diphenylmethane-2,4'-and/or -4,4'-diisocyanate, napthalene-1,5-diisocyanate, triphenylmethane-4,4',4"-triisocyanate and polyphenyl polymethylene polyisocyanates obtained by phosgenating aniline/formaldehyde condensation products. Also suitable are polyisocyanates adducts containing urea, biuret, urethane, allophanate, uretdione or carbodiimide groups or isocyanurate rings. These adducts may be prepared from any known monomeric polyisocyanates, especially those set forth above, by known methods. When using low molecular weight, highly volatile diisocyanates, it is especially preferred to convert these diisocyanates into adducts with lower monomeric diisocyanate contents prior to dispersing them in water. It is also possible to use mixtures of any of these monomeric polyisocyanates and/or polyisocyanate adducts.

In general, it is particularly preferred to use readily available polyisocyanates such as polyphenyl polymethylene polyisocyanates ("crude MDI") and polyisocyanate adducts containing carbodiimide groups, urethane groups, allophanate groups, isocyanurate groups, urethane groups or biuret groups, especially those based on 2,4- and/or 2,6-toluylene diisocyanate ("TDI"), 1,6-hexamethylene diisocyanate, isophorone diisocyanate and mixtures thereof.

The polyisocyanates or polyisocyanate adducts used to prepare the aqueous dispersions of the present invention may be used in their unmodified, hydrophobic form or they may be rendered hydrophilic by admixture with external emulsifiers or by reaction with cationic, anionic and/or nonionic compounds containing isocyanate-reactive groups. The reaction components which ensure the dispersibility of the polyisocyanates include compounds containing lateral or terminal, hydrophilic ethylene oxide units and compounds containing ionic groups or potential ionic groups.

The compounds containing lateral or terminal, hydrophilic ethylene oxide units contain at least one, preferably one, isocyanate-reactive group and are used in an amount sufficient to provide a content of hydrophilic ethylene oxide units of up to about 40% by weight, preferably about 5 to 40% by weight and more preferably about 10 to 35% by weight, based on the weight of the modified polyisocyanate. The compounds containing ionic groups or potential ionic groups contain at least one, preferably two, isocyanate-reactive groups and are used in an amount of up to about 120 milliequivalents, preferably about 5 to 80 milliequivalents, more preferably about 10 to 60 milliequivalents and most preferably about 15 to 50 milliequivalents per 100 grams of modified polyisocyanate.

Hydrophilic components having terminal or lateral hydrophilic chains containing ethylene oxide units include compounds corresponding to the formulae $$H-Z-X-Y-R''$$

or

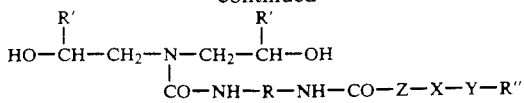

wherein

R represents a difunctional radical obtained by removing the isocyanate groups from a diisocyanate corresponding to those previously set forth, R' represents hydrogen or a monovalent hydrocarbon radical containing from 1 to 8 carbon atoms, preferably hydrogen or a methyl group, R" represents a monovalent hydrocarbon radical having from 1 to 12 carbon atoms, preferably an unsubstituted alkyl radical having from 1 to 4 carbon atoms, X represents the radical obtained by removing the terminal oxygen atom from a polyalkylene oxide chain having from 5 to 90 chain members, preferably 20 to 70 chain members, wherein at least about 40%, preferably at least about 65%, of the chain members comprise ethylene oxide units and the remainder comprises other alkylene oxide units such as propylene oxide, butylene oxide or styrene oxide units, preferably propylene oxide units, Y represents oxygen or $-NR'''-$ wherein R''' has the same definition as R" and Z represents a radical which corresponds to Y, but may additionally represent $-NH-$.

The compounds corresponding to the above formulae may be produced by the methods according to U.S. Pat. Nos. 3,905,929, 3,920,598 and 4,190,566 (the disclosures of which are herein incorporated by reference). The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

The compounds containing ionic groups or potential ionic groups for providing hydrophilicity to the polyisocyanates may be cationic or anionic. Examples of anionic groups include carboxylate groups and sulphonate groups. Examples of cationic groups include tertiary and quaternary ammonium groups and tertiary sulphonium groups. The ionic groups are formed by neutralizing the corresponding potential ionic groups either prior to, during or after their reaction with the polyisocyanate. When the potential ionic groups are neutralized prior to forming the modified polyisocyanate, ionic groups are incorporated directly. When neutralization is performed subsequent to forming the prepolymer, potential ionic groups are incorporated. Suitable compounds for incorporating the previously discussed carboxylate, sulphonate, tertiary sulphonium and tertiary or quaternary ammonium groups are described in U.S. Pat. Nos. 3,479,310, 4,108,814, 3,419,533 and 3,412,054, the disclosure of which are herein incorporated by reference.

In addition to the previously discussed hydrophilic modifiers, which are chemically incorporated into the polyisocyanates, it is also possible to use external emulsifiers which may be anionic, cationic or nonionic. Further, when dispersion stability is not a specific requirement, it is possible to disperse the polyisocyanate in water in the absence of emulsifiers by using high shear mixers, for example, those disclosed in British Patents 1,414,930, 1,432,112 and 1428,907 as well as German Offenlegungsschrift 2,347,299. Low shear mixers may also be used to disperse the polyisocyanates in water such as the stator-rotor dynamic mixer disclosed in U.S. Pat. No. 4,742,095.

The polyisocyanates to be dispersed in water preferably have a functionality of at least 2, more preferably at least 2.2. These compounds may be prepared by reacting polyisocyanates having functionalities of greater than 2 with a monofunctional compound containing hydrophilic groups, provided that the average functionality remains at least 2. When diisocyanates are used as the polyisocyanate, it is preferred to use difunctional compounds containing hydrophilic groups in order to maintain a functionality of at least 2. The treatment of diisocyanates with monofunctional compounds containing hydrophilic groups is less preferred since this reduces the functionality to less than 2. Accordingly, the functionality of the component containing hydrophilic groups and the functionality of the polyisocyanate must be taken into consideration in order to ensure that the modified polyisocyanates have functionalities of at least 2.

The polyisocyanate dispersions generally have a solids content of about 2 to 50, preferably about 10 to 30 weight percent.

After the polyisocyanates have been dispersed in water, they may optionally be reacted with primary or secondary monoamines containing one or two hydroxy groups and/or with polyamines having primary and/or secondary amino groups. Suitable monoamines include those which correspond to the formula

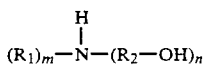

$$(R_1)_m - \underset{\underset{H}{|}}{N} - (R_2 - OH)_n$$

where
$R_1$ represents hydrogen or an alkyl, cycloalkyl, araliphatic or aromatic group having up to 15 carbon atoms, preferably an alkyl group containing 1 to 6 carbon atoms,
$R_2$ is an optionally branched alkylene group containing 1 to 12, preferably 1 to 4 carbon atoms,
m represents 0 or 1,
n represents 1 or 2 and
$m+n=2$.

Examples of suitable monoamines include ethanolamine, propanolamine, butanolamine, N-methylethanolamine, N-ethylethanolamine, N-propylethanolamine, N-butyl-ethanolamine, N-methylpropanolamine, N-ethyl-propanolamine, N-propylpropanolamine, N-butyl-propanolamine, N-methylbutanolamine, N-ethyl-butanolamine, N-propylbutanolamine, N-butyl-butanolamine, diethanolamine, dipropanolamine, dibutanolamine, and N-ethanol-N-propanolamine. Ethanolamine is especially preferred.

Suitable polyamines for reacting with the aqueously dispersed polyisocyanates are those having a molecular weight of less than about 400 and containing two or more primary and/or secondary amino groups. The amino groups may aliphatically-, cycloaliphatically-, araliphatically- or aromatically-bound. Examples of suitable polyamines include ethylene diamine, 1,3-propane diamine, 1,4-butane diamine, 2-methyl-pentamethylene diamine, N,N'-dimethyl-ethylene diamine, diethylene triamine, triethylene tetraamine, tetraethylene pentamine, pentaethylene hexamine, 1,6-hexane diamine, piperazine, 2,5-dimethyl piperazine, 1-amino-3-aminomethyl-3,5,5-trimethylcyclohexane (isophorone diamine), bis-(4-aminocyclohexyl)-methane, bis-(4-amino-3-methylcyclohexyl)-methane, 1,2 and 1,4-cyclohexane-diamine, 1,2-propane diamine, hydrozine, aminoacid hydrazides, hydrazides of semicarbazido carboxylic acids, bis-hydrazides, bis-semicarbazides, N,N,N-tris-(2-aminoethyl)-amine, N-(2-piperazinoethyl) ethylene diamine, N,N'-bis-(2-aminoethyl)-piperazine, N,N,N'-tris-(2-aminoethyl)-ethylene diamine, N-[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)-amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylene pentamine, tripropylene tetramine, N,N-bis-(6-aminohexyl)-amine, N,N'-bis-(3-aminopropyl)-ethylene diamine, 2,4-bis-(4'-aminobenzyl)-aniline, diethyl-toluene diamine isomers, toluene diamine isomers, 1,3-phenylene diamine, methylene-bis-(phenylamine) isomers, 1,5-naphthalene diamine, aniline, alkyl anilines, toluidine, t-butyl-toluene diamine isomers, methylene-bis-(o-dichloroaniline) (MOCA), 24,-diaminoalkyl-benzene isomers having 8 to 15 carbon atoms in the alkyl chain and mixture of these polyamines.

Preferred polyamines include ethylene diamine, 1,3-propane diamine, 1,4-butene diamine, 2-methyl-pentamethylene diamine, N,N'-dimethyl-ethylene diamine, diethylene triamine, piperazine, 1-amino-3-aminomethyl-3,5,5-trimethylcyclohexane (isophorone diamine), bis-(4-aminocyclohexyl)-methane, 1,2-propane diamine, hydrozine, diethyl-toluene diamine isomers, 1,3-phenylenediamine and mixtures thereof.

The advantage obtained by reacting the dispersed polyisocyanate with the monoamine containing one or two hydroxyl groups as disclosed in copending application, U.S. Ser. No. 07/529,056, filed May 25, 1990 (herein incorporated by reference), is to reduce the isocyanate content of the aqueous polyisocyanate dispersions by reacting the dispersed polyisocyanates. Such a modification is not necessary in accordance with the present invention to seal and prime concrete when using the preferred polyisocyanate starting materials.

The advantage obtained by reacting the dispersed polyisocyanate with a polyamine as disclosed in copending application, (herein incorporated by reference), is to increase the pot life of the aqueous polyisocyanate dispersions by encapsulating the dispersed polyisocyanates and reducing their reactivity to water. If it is not possible to apply the aqueous polyisocyanate dispersions to concrete within a short time after dispersing the polyisocyanate in water, the reaction with the polyamine would be beneficial in accordance with the present invention.

The advantage of reacting the dispersed polyisocyanates with both monoamines and polyamines is disclosed in copending application, (herein incorporated by reference). By reacting the dispersed polyisocyanates with both a monoamine and polyamine the isocyanate content of the modified polyisocyanates can be further reduced without forming non-flowable gels.

If the optional monoamines and/or polyamines are reacted with the dispersed polyisocyanates in accordance with the present invention, they may be added to the water either before, during or after the polyisocyanate has been dispersed. Preferably, the polyisocyanate is first dispersed in water and then the monoamine and/or polyamine are added to the dispersed polyisocyanate. If the dispersed polyisocyanate is to be modified with both a monoamine and polyamine, the monoamine may be added prior to the polyamine or they may added at the same time, preferably in admixture. It is not recommended to add the polyamine before the monoamine because the polyamine will encapsulate the polyisocyanate making further reaction with the monoamine difficult because the monoamine will have to migrate to the inside of the encapsulated, dispersed polyisocyanate particle. If the polyamine is added in an amount that is less than the amount required to encapsulate all of the dispersed polyisocyanate particles, it is possible to add the polyamine before the monoamine; however, this is not recommended.

The amount of the optional monoamine containing at least one hydroxyl group is chosen to provide an equivalent ratio of amino groups to isocyanate groups of the polyisocyanate of 0:1.0 to 0.7:1.0, preferably 0.1:1.0 to 0.7:1.0 and more preferably 0.2:1.0 to 0.6:1.0. The amount of the optional polyamine is chosen to provide an equivalent ratio of amino groups to isocyanate groups of 0:1.0 to 0.4:1.0, preferably 0.1:1.0 to 0.4:1.0 preferably 0.15:1.0 to 0.35:1.0. The amounts of monoamine and polyamine are also chosen to ensure that the equivalent ratio of the total amount of amino groups to isocyanate groups does not exceed 0.95:1.0.

If the dispersed polyisocyanate is to be modified with both a monoamine and polyamine in accordance with the present invention, it is possible to obtain a dispersed, modified polyisocyanate which has a low free isocyanate content and which does not form a viscous mass which is not longer flowable and which cannot be reliquified. The aqueous dispersion of the modified polyisocyanate is obtained in the form of a liquid or in the form of a non-flowable solid which can be reliquified with mild agitation.

The maximum amount of the monoamine and polyamine which may optionally be reacted with the dispersed polyisocyanate in accordance with the present invention depends upon the solids content of the polyisocyanate dispersion. At a solids content of 10% by weight a maximum amount of 35% of the isocyanate groups may be reacted with the amino groups of the monoamine and a maximum of 25% of the isocyanate groups may be reacted with the polyamine to produce the modified polyisocyanate. At a solids content of 5% by weight a maximum amount of 50% of the isocyanate groups may be reacted with the amino groups of the monoamine and a maximum of 30% of the isocyanate groups may be reacted with the polyamine to produce the modified polyisocyanate.

When the polyisocyanate dispersion has an even lower solids content, the maximum percentage of the isocyanate groups which can be reacted can be further increased; however, preferably a sufficient percentage of the isocyanate groups react with the polyamine to ensure that the modified polyisocyanate is in the form of a liquid or in the form of a non-flowable solid which can be reliquified.

The amount of the polyamine which is necessary to ensure that the modified polyisocyanate is either liquid or a non-flowable solid which can be reliquified is dependent upon the solids content of the polyisocyanate dispersion and upon the particular polyamine which is reacted with the polyisocyanate. For example, more ethylene diamine can be reacted with the polyisocyanate before it is encapsulated than 2-methyl-pentamethylene diamine.

In accordance with the present invention it is important not to react all of the isocyanate groups prior to applying the low NCO content polyisocyanate dispersions to concrete. If all of the isocyanate groups have been reacted prior to this step, then the polyisocyanate is no longer film forming and will not adequately seal the concrete. Accordingly, prior to applying the polyisocyanate dispersion to the fibers, the NCO content should be at least 0.5%, preferably at least 1.0% by weight, based on the weight of the modified polyisocyanate.

If the dispersed polyisocyanate is to be modified with both a monoamine and polyamine in accordance with the present invention and the polyisocyanate dispersion is to be applied to concrete immediately after the addition of the monoamine and polyamine, i.e., within 10 to 20 minutes, then the upper limit of chain extender to be added is an amount sufficient to provide an equivalent ratio of amino groups to isocyanate groups of about 0.95:1.0. This is because the hydroxyl groups of the monoamine will not have sufficient time to react with the isocyanate groups before the dispersed polyisocyanate is applied to concrete, thus ensuring a sufficient NCO content to provide a film-forming polyisocyanate. To the contrary, if it will be more than 20 minutes after the addition of the chain extender before the polyisocyanate dispersion is to be applied to concrete, then lesser amounts of the chain extender should be used so that the isocyanate content will be at least 0.5% by weight as previously discussed. While, it is preferred to apply the dispersed polyisocyanate to the concrete within 10 to 20 minutes after the addition of the chain extender, this is not always possible. However, in accordance with the present invention it is possible to extend this time period from a few hours to several days by reacting the dispersed polyisocyanate with a polyamine in order to encapsulate the polyisocyanate and reduce its reactivity with water.

In accordance with the present invention it is possible not only to seal and prime green concrete, but also to prime concrete which is fully cured.

The aqueous polyisocyanate dispersions generally have a viscosity of about 5 to 5000, preferably 20 to 1000 mPa.s when they are applied to concrete. Higher viscosities are not recommended because the aqueous polyisocyanate dispersions will not sufficiently penetrate concrete to provide adequate sealing. The aqueous polyisocyanate dispersions are applied to the concrete in an amount sufficient to provide about 5 to 300, preferably 10 to 150 g of polyisocyanate solids per m$^2$ of concrete.

In accordance with the present invention, it is also possible to incorporate additives into the polyisocyanate emulsions. The additives may be present in the form of a solution or in the form of an emulsion or dispersion. These additives are known and include catalysts such as tertiary amines, aminosilanes having carbon-silicon bonds, ammonium hydroxides and organo metallic compounds; surface-active agents; reaction retarders; and adhesion promoters. Examples of suitable additives which may optionally be used in accordance with the present invention and details on the way in which these additives are to be used and how they function may be found in Kunststoff-Handbuch, Vol. VII, published by Vieweg and Hochtlen, Carl-Hanser-Verlag, Munich 1966, for example on pages 103 to 113.

The invention is further illustrated but is not intended to be limited by the following examples in which all parts and percentages are by weight unless otherwise specified.

EXAMPLES

Example 1—Preparation of Modified Polyisocyanate

A three liter round bottom flask equipped with a thermometer, drying tube, condenser, and stirrer was charged with 1366 grams of Crude MDI[1] and 683 grams of a monofunctional poly(ethylene oxide) ether[2]. The temperature of the reaction flask was increased to 80° C. The reaction proceeded at this temperature for four hours at which time the isocyanate content was determined by titration to be 20.48% (theoretical NCO=20.68%). The prepolymer was cooled to ambient temperature and placed in dry bottles for later use.

1 An aniline/formaldehyde condensation product containing 4,4'-diphenylmethane diisocyanate and about 50% of higher functionality homologs and having an isocyanate content of about 31.5% and a viscosity at 25° C. of 200 mPa.s.
2 A polyether monohydric alcohol having a molecular weight of 2200 and prepared from n-butanol, ethylene oxide and propylene oxide (molar ratio of ethylene oxide to propylene oxide—83:17).

Example 2—Preparation of Aqueous Polyisocyanate Dispersion

A two liter resin flask was charged with 822 grams of demineralized water at ambient temperature. While rapidly stirring the water, 355 grams of the prepolymer from Example 1 were added in about four minutes to the flask. The resulting off-white polyisocyanate dispersion had an isocyanate content of 6% as determined by titration, a low viscosity of less than 50 mPa.s at 25° C., a solids content of 30% and a pH of 7.

Example 3—Application of Polyisocyanate Dispersion to Concrete

The aqueous polyisocyanate dispersion from Example 2 was applied with a brush to two of three sections of a fully cured concrete panel at a wet film thickness of about 25 microns and allowed to cure at room temperature overnight. The remaining section and one of the sections which had previously been coated were top-coated with a titanium dioxide-pigmented, aqueous polyurethane dispersion applied by brush at a wet film thickness of about 25 microns. The pigmented polyurethane dispersion was based on Bayhydrol 110 (an aqueous polyurethane dispersion available from Mobay Corporation) and contained about 15% by weight of titanium dioxide pigment. The topcoat was allowed to cure for three weeks at room temperature. Cross-hatch tape adhesion tests (ASTM D-3359-831) demonstrate excellent adhesion of the primer to the concrete as well as excellent adhesion of the topcoat to the primer. However, poor adhesion was obtained between the topcoat and the concrete.

Example 4—Application of Polyisocyanate Dispersion to "Green" Concrete

Concrete was prepared and formed into blocks to be used as substrates for primer/sealant evaluation. The aqueous polyisocyanate dispersion from example 2 was applied with a brush at a wet film thickness of about 25 microns (about 7 g/m$^2$) to 6 hour old "green" concrete block and to a 24 hour old concrete block. The sealant/primers were allowed to age for 15 days at room temperature before carrying out the cross-hatch tape adhesion test. On both samples adhesion failure occurred within the upper layer of the concrete substrate, not between primer/sealer and concrete. These results demonstrate that the adhesion of the primer to the concrete exceeds the strength of the substrate itself.

Example 5—Application of Polyisocyanate Dispersion to "Green" Concrete

Three identical blocks of concrete (3.75"×7.5"×1") were prepared. 24 hours after preparation, one block (A) was weighed and coated on all sides using a brush with the aqueous polyisocyanate dispersion of Example 2 at a wet film thickness of 25 microns. 24 hours after preparation, a second block (B) was coated in the same manner as the first block; however, the second block also also received a second 25 micron coat of the aqueous polyisocyanate dispersion. The third block (c) was left uncoated to serve as a control The weight loss of each of the blocks, due to water evaporation, was measured over time. The results are set forth below.

| % Weight Loss by Concrete Blocks Due to Water Evaporation | | | |
|---|---|---|---|
| Time (days) | Block A (1 Coat) | Block B (2 Coats) | Block C (Control) |
| 1 | −3.07 | −1.98 | −4.4 |
| 2 | −4.5 | −3.0 | −5.7 |
| 5 | −6.2 | −5.0 | −7.2 |
| 7 | −6.9 | −5.4 | −7.8 |
| 14 | −7.9 | −6.9 | −8.6 |
| 21 | −8.0 | −7.4 | −8.6 |
| 28 | −8.4 | −8.0 | −9.0 |

The reduced water evaporation rate for the blocks coated in accordance with the present invention demonstrates the sealant effect of the aqueous polyisocyanate dispersion of Example 2.

Although the invention has been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:
1. A process for sealing an/or priming concrete which comprises applying to concrete an aqueous polyisocyanate dispersion which has an isocyanate content of at least 0.5% by weight, based on the weight of the polyisocyanate, and is prepared by a process which comprises
   a) dispersing in water a polyisocyanate which has an isocyanate content of at least 12% by weight and
   b) optionally reacting the dispersed polyisocyanate with
      i) a primary or secondary monoamine containing one or two hydroxyl groups in an amount sufficient to provide an equivalent ratio of amino groups to isocyanate groups of 0:1.0 to 0.7:1.0 and/or ii) a polyamine having primary and/or secondary amino groups and a molecular weight of 400 or less in an amount sufficient to provide an equivalent ratio of amino groups to isocyanate groups of 0:1.0 to 0.4:1.0, provided that when components i) and ii) are both reacted with the dispersed polyisocyanate, component i) is mixed with the dispersed polyisocyanate either before or during the mixing of component ii) and the equivalent ratio of amino groups from both components i) and ii) does not exceed 0.95:1.0.

2. The process of claim 1 wherein said dispersed polyisocyanate is rendered hydrophilic by reaction with a compound containing a lateral or terminal nonionic hydrophilic group.

3. The process of claim 1 wherein said primary or secondary monoamine corresponds to the formula

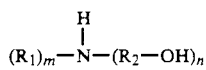

wherein
R$_1$ represents hydrogen or an alkyl, cycloalkyl, araliphatic or aromatic group having up to 15 carbon atoms,
R$_2$ is an optionally branched alkylene group containing 1 to 12 carbon atoms,
m represents 0 or 1,
n represents 1 or 2 and
m+n=2.

4. The process of claim 3 wherein
R$_1$ is an alkyl group containing 1 to 6 carbon atoms and
R$_2$ is an optionally branched alkylene group containing 1 to 4 carbon atoms.

5. The process of claim 1 wherein said concrete is green concrete.

6. The process of claim 1 wherein said monoamine is present in an amount sufficient to provide an equivalent ratio of amino groups to isocyanate groups of 0.1:1.0 to 0.7:1.0.

7. The process of claim 1 wherein said polyamine is present in an amount sufficient to provide an equivalent ratio of amino groups to isocyanate groups of 0.1:1.0 to 0.4:1.0.

8. The process of claim 7 wherein said polyamine is present in an amount sufficient to provide an equivalent ratio of amino groups to isocyanate groups of 0.1:1.0 to 0.4:1.0.

9. A process for sealing and/or priming concrete which comprises applying to concrete an aqueous polyisocyanate dispersion which has a functionality of at least 2 and an isocyanate content of at least 0.5% by weight, based on the weight of the polyisocyanate, and is prepared by a process which comprises
a) dispersing in water a polyisocyanate which has an isocyanate content of at least 12% by weight and is rendered hydrophilic by reaction with a compound containing a lateral or terminal nonionic hydrophilic group and
b) reacting the dispersed polyisocyanate with at least one of
i) a primary or secondary monoamine containing one or two hydroxyl groups in an amount sufficient to provide an equivalent ratio of amino groups to isocyanate groups of 0.1:1.0 to 0.7:1.0 and ii) a polyamine having primary and/or secondary amino groups and a molecular weight of 400 or less in an amount sufficient to provide an equivalent ratio of amino groups to isocyanate groups of 0.1:1.0 to 0.4:1.0, provided that when components i) and ii) are both reacted with the dispersed polyisocyanate, component i) is mixed with the dispersed polyisocyanate either before or during the mixing of component ii) and the equivalent ratio of amino groups from both components i) and ii) does not exceed 0.95:1.0.

10. The process of claim 9 wherein said primary or secondary monoamine corresponds to the formula

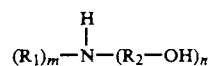

wherein
R$_1$ represents hydrogen or an alkyl, cycloalkyl, araliphatic or aromatic group having up to 15 carbon atoms,
R$_2$ is an optionally branched alkylene group containing 1 to 12 carbon atoms,
m represents 0 or 1,
n represents 1 or 2 and
m+n=2.

11. The process of claim 10 wherein
R$_1$ is an alkyl group containing 1 to 6 carbon atoms and
R$_2$ is an optionally branched alkylene group containing 1 to 4 carbon atoms.

12. The process of claim 9 wherein said concrete is green concrete.

13. Sealed and/or primed concrete which is prepared by applying to concrete an aqueous polyisocyanate dispersion which has an isocyanate content of at least 0.5% by weight, based on the weight of the polyisocyanate, and is prepared by a process which comprises
a) dispersing in water a polyisocyanate which has an isocyanate content of at least 12% by weight and
b) optionally reacting the dispersing polyisocyanate with
i) a primary or secondary monoamine containing one or two hydroxyl groups in an amount sufficient to provide an equivalent ratio of amino groups to isocyanate groups of 0:1.0 to 0.7:1.0 and/or
ii) a polyamine having primary and/or secondary amino groups and a molecular weight of 400 or less in an amount sufficient to provide an equivalent ratio of amino groups to isocyanate groups of 0:1.0 to 0.4:1.0, provided that when components i) and ii) are both reacted with the dispersed polyisocyanate, component i) is mixed with the dispersed polyisocyanate either before or during the mixing of component ii) and the equivalent ratio of amino groups from both components i) and ii) does not exceed 0.95:1.0.

14. The concrete of claim 13 wherein said dispersed polyisocyanate is rendered hydrophilic by reaction with a compound containing a lateral or terminal nonionic hydrophilic group.

15. The concrete of claim 13 wherein said primary or secondary monoamine corresponds to the formula

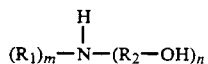

wherein
  $R_1$ represents hydrogen or an alkyl, cycloalkyl, araliphatic or aromatic group having up to 15 carbon atoms,
  $R_2$ is an optionally branched alkylene group containing 1 to 12 carbon atoms,
  m represents 0 or 1,
  n represents 1 or 2 and
  m+n=2.

16. The concrete of claim 15 wherein
  $R_1$ is an alkyl group containing 1 to 6 carbon atoms and
  $R_2$ is an optionally branched alkylene group containing 1 to 4 carbon atoms.

17. The concrete of claim 13 wherein said concrete is green concrete.

18. The concrete of claim 13 wherein said monoamine is present in an amount sufficient to provide an equivalent ratio of amino groups to isocyanate groups of 0.1:1.0 to 0.7:1.0.

19. The concrete of claim 13 wherein said polyamine is present in an amount sufficient to provide an equivalent ratio of amino groups to isocyanate groups of 0.1:1.0 to 0.4:1.0.

20. The concrete of claim 19 wherein said polyamine is present in an amount sufficient to provide an equivalent ratio of amino groups to isocyanate groups of 0.1:1.0 to 0.4:1.0.

21. A sealed or primed concrete which is prepared by applying to concrete an aqueous polyisocyanate dispersion which has a functionality of at least 2 and an isocyanate content of at least 0.5% by weight, based on the weight of the polyisocyanate, and is prepared by a process which comprises
  a) dispersing in water a polyisocyanate which has an isocyanate content of at least 12% by weight and is rendered hydrophilic by reaction with a compound containing a lateral or terminal nonionic hydrophilic group and
  b) reacting the dispersed polyisocyanate with at least one of
    i) a primary or secondary monoamine containing one or two hydroxyl groups in an amount sufficient to provide an equivalent ratio of amino groups to isocyanate groups of 0.1:1.0 to 0.7:1.0 and
    ii) a polyamine having primary and/or secondary amino groups and a molecular weight of 400 or less in an amount sufficient to provide an equivalent ratio of amino groups to isocyanate groups of 0.1:1.0 to 0.4:1.0,
  provided that when components i) and ii) are both reacted with the dispersed polyisocyanate, component i) is mixed with the dispersed polyisocyanate either before or during the mixing of component ii) and the equivalent ratio of amino groups from both components i) and ii) does not exceed 0.95:1.0.

22. The concrete of claim 21 wherein said primary or secondary monoamine corresponds to the formula

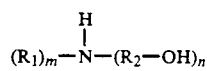

wherein
  $R_1$ represents hydrogen or an alkyl, cycloalkyl, araliphatic or aromatic group having up to 15 carbon atoms,
  $R_2$ is an optionally branched alkylene group containing 1 to 12 carbon atoms,
  m represents 0 or 1,
  n represents 1 or 2 and
  m+n=2.

23. The concrete of claim 22 wherein
  $R_1$ is an alkyl group containing 1 to 6 carbon atoms and
  $R_2$ is an optionally branched alkylene group containing 1 to 4 carbon atoms.

24. The concrete of claim 21 wherein said concrete is green concrete.

* * * * *